May 12, 1964  L. POMPA  3,132,420
PACK FORMED CONTOURED LIGHT GAGE MISSILE HEADS
Filed Dec. 30, 1960  2 Sheets-Sheet 1

INVENTOR
LEONARD POMPA

BY Mason, Mason & Albright
ATTORNEYS

May 12, 1964
L. POMPA
3,132,420
PACK FORMED CONTOURED LIGHT GAGE MISSILE HEADS
Filed Dec. 30, 1960
2 Sheets-Sheet 2
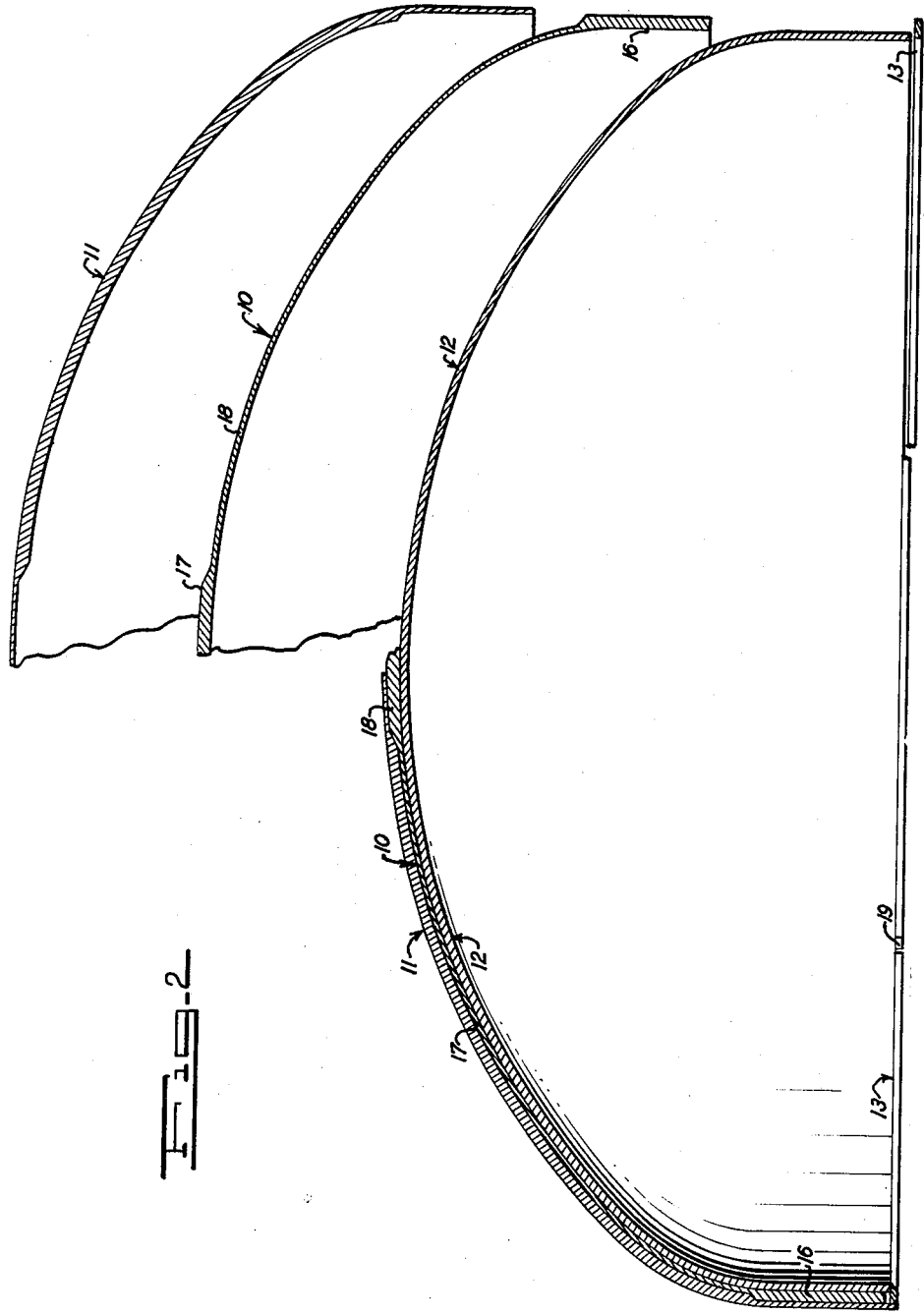
INVENTOR.
LEONARD POMPA
BY Mason, Mason & Albright
ATTORNEYS

United States Patent Office 3,132,420
Patented May 12, 1964

3,132,420
PACK FORMED CONTOURED LIGHT GAGE
MISSILE HEADS
Leonard Pompa, Ardmore, Pa., assignor to Lukens Steel Company, Coatesville, Pa., a corporation of Pennsylvania
Filed Dec. 30, 1960, Ser. No. 79,743
4 Claims. (Cl. 29—544)

This invention relates to a method of forming contoured heads having integral raised sections for threaded openings or other attachments.

In recent years a market has been created for strong, light-weight, highly reliable contoured heads which have one or more raised portions for various attachments. Such heads are generally semiellipsoidal in shape and used as fore and aft heads in missiles. The method generally employed for making such heads is by forging the head into the shape desired and machining it to size. This method has, however, the disadvantages of being an expensive operation and that flaws in the metal are frequently not discovered until too late. In such process, it is necessary to remove an excessive amount of material in the machining operation and a high percentage of expensive material is lost as scrap. Contoured heads may also be made by explosive forming, but in the present state of the art for the size and shape heads generally required, welding of several parts together is necessary in conjunction with the explosive-forming operation. Moreover, welding is frequently considered not sufficiently foolproof and to be avoided if possible. Heads may also be produced by hydro-spinning and machining, but this method carries with it the same disadvantages as the forge-forming method.

It is an object of this invention to provide a method for forming contoured heads having integral raised sections for threaded openings and other attachments free of undesirable welding with a greater degree of accuracy, and at less cost than present methods involving forging and machining contours, explosive forming, or hydro-spinning heads. It is a further object to provide a method of forming contoured heads whereby the method itself provides a test for flaws which would not be revealed by forging methods. It is a further object to produce a head having minimal decarbonization in the surface area.

It is still a further object to produce heads of the type described having a heavy straight flange which may be rolled or ironed to produce a seamless attached shell section for the head.

Since quality is the main objective of these contoured heads it is emphasized that this method of manufacture will not hide material defects, but to the contrary will produce a part having nothing but the best pretested structure.

It will be understood that heads of the type involved are comparatively large—being usually over four feet in diameter. It was found, contrary to expectations, that such heads could be produced by a pack-forming method with minimal gauge changes in the material comprising the head.

The accompanying drawings represent, by way of example, a method of carrying out the invention:

FIGURE 2 is a sectional view of the pack after the forming operation with the elements in the right-hand portion being exploded.

The pack 9 is prepared by using a contour-machined high-strength steel plate 10 between an outside contour-machined mild steel plate 11 and an inside flat machined mild steel plate 12 to make up the assembly.

Figure 1:
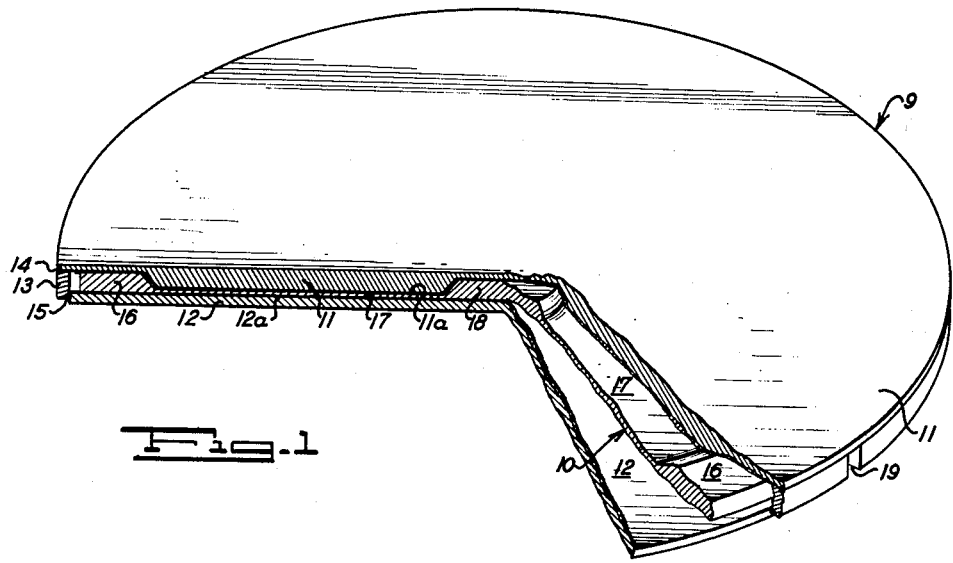
FIGURE 1 is a perspective view of the pack prior to forming operations with a broken portion to show the interior construction.

To prepare the pack, the insert 10 which may be stainless steel, titanium, or other metal suitable to the ultimate use is first gas cut into a circular piece which is stress-relieved and flattened in machining operations. The flat side of insert 10 is machined first to produce a true flat surface for clamping same to the boring mill table. Insert 10 is then contour-machined on the other side in a boring mill table so as to appear in cross-section as shown in FIGURE 1. In the embodiment shown in the drawings, there is a flange portion 16, a thinner head portion 17 and a raised portion 18.

With a steel insert 10, it has been found preferable to employ a magnetic chuck for holding it in the machining operation to insure flatness and parallelism. The machining is performed to a close tolerance and it is preferable to finish off by grinding in order to produce good surfaces and the desired thickness throughout insert 10. The outside contoured steel plate 11 is prepared in much the same manner as insert 10. Plate 11 is contoured to conform to the contours of the insert 10 so that plate 11 and insert 10 will fit together as shown in FIGURE 1. Outside plate 11 is preferably thicker than the insert 10 inasmuch as this will prevent rupture of outside plate 11 in the subsequent pressing operation. Inside plate 12 is prepared in much the same manner as insert 10 and outside plate 11. However, it is machined flat on both sides and contouring is not necessary. It is desirable that all plates be finish-ground.

For preparation of pack 9 shown in FIGURE 1 the plates, now milled and ground to size, are cleaned and the inside and outside plates are coated with a parting compound 11a and 12a (see FIGURE 1) on their inner surfaces. Insert 10 is placed between the outside plate 11 and inside plate 12 to form a three-ply sandwich-like assembly as shown in FIGURE 1. The inside and outside plates are secured to each other by a strip 13 welded along the circumference of the pack. The welds 14 and 15 are weld-dressed in the usual manner by peening and grinding. Two vent holes such as vent hole 19 are provided by leaving two gaps of, say, one-fourth inch, 180° apart in the welds 14 and 15 together with the seal strip 13.

When the pack 9 is prepared as described above, it is ready for forming. It is first heated to forming temperature. With a steel insert 10, this would normally be to a cherry red color. It is then removed from the furnace and partially drawn in a forming press. A conventional press may be employed with an appropriately shaped pressing die incorporating a punch, draw ring, clamp ring, etc. It is then taken from the press, returned again to the furnace, and heated for an additional period of approximately twenty minutes at the same temperature as before when it is again returned for further pressing. This process is repeated several times in accordance with known forming techniques, until the pack is finally pressed into the semiellipsoidal shape as shown in FIGURE 2. When this is accomplished, the pack may be annealed. On completion of annealing, the excess metal around the flange portion including strip 13 is removed by gas cutting or other known means and the bottom area is dressed by grinding.

Figure 3:
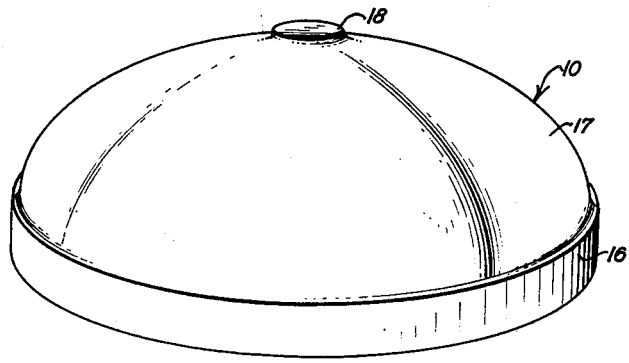
FIGURE 3 is a perspective view of the contoured head after it has been removed from the pack.

Outer plate 11, as shown in FIGURE 2, is removed quite easily. Inner plate 12 is also removed, leaving a formed contoured head 10, as shown in FIGURE 3. Plates 11 and 12 may be discarded for scrap, or, in the alternative, either plate 11 or 12 may be used as a support for the insert 10, in the event finish machining of insert 10 is desired.

Figures 4, 5:
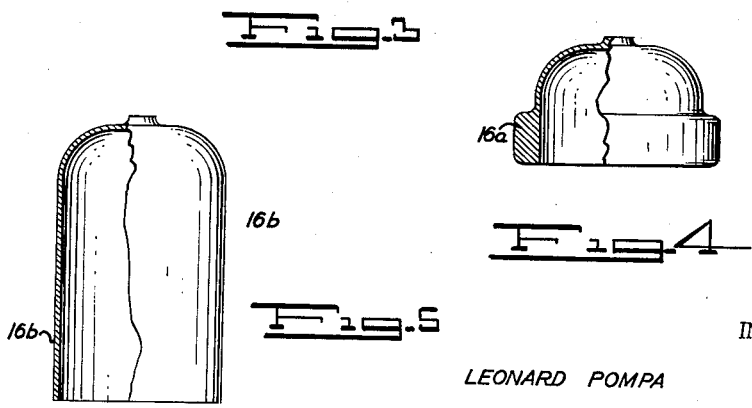
FIGURE 4 is an elevational view of a contoured head with a modified flange portion, a portion of the view being broken to show part of the head in section.
FIGURE 5 shows the modification of FIGURE 4 with the flange ironed out to form a shell section.

If the foregoing process is executed properly, contrary to anticipation, the gauge of the head will be found to have undergone little change throughout from that what initially existed in insert 10 before the forming operation. This will be true in both the thin and thicker sections. Experience shows that differences of as much as ten percent in any one place are exceptional. The resulting surfaces are good with very little decarb. Nevertheless, in view of the high quality product demanded, it will usually be found desirable to include a finishing grinding operation on the formed insert or head 10 in order to insure a constant gauge throughout the thin sections. The flange 16 may, if desired, be made considerably thicker and longer than that shown in the drawings as illustrated by flange 16a in FIGURE 4. With such structure, flange 16a may be rolled or ironed down to produce a seamless attached shell section 16b as shown in FIGURE 5.

It will be understood that other sizing operations may be performed on head 10 to obtain greater accuracy in the ultimate product.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. As an improvement in the art of manufacturing semiellipsoidal heads with raised portions, a method of manufacturing said heads which consists of machining raised portions in at least the center and periphery of a circular flat steel plate insert, machining a first steel cover plate to receive said raised portions, preparing a second steel cover plate, making a pack with said insert sandwiched between said cover plates and with parting compound between said insert and said cover plates, said first cover plate receiving said raised portions in said pack, heating said pack to a substantially cherry red color, partially drawing said pack in a forming press, withdrawing said pack from said press, reheating said pack to substantially red color and again drawing said pack into a substantially semiellipsoidal shape, and removing said cover plates from said insert.

2. The method of making heads for use as fore and aft heads in missiles which comprises machining a circular steel alloy plate to predetermined contours including relatively thicker portions in the center and periphery thereof, machining a further circular steel plate to contours inverse of those machined in the first mentioned plate, preparing a yet further circular steel plate, sandwiching said first mentioned plate in a pack between said further plates with parting compound separating said plates, heating said pack to a substantially cherry red color, partially drawing said pack in a forming press, withdrawing said pack from said press, reheating said pack to substantially red color and again drawing said pack into a substantially semiellipsoidal shape, and removing said further plates from the first mentioned plate.

3. A method of manufacturing a contoured head for use in missiles which comprises machining predetermined contours on a circular high-strength steel plate which include a raised circular flange portion in the center of said plate and a further flange portion around the periphery of said plate, machining contours inverse of those machined on the aforesaid plate on a first circular mild steel cover plate, preparing a second circular mild steel cover plate, placing said high-strength steel plate in a pack between said cover plates with parting compound interposed between said cover plates and said high-strength steel plate, alternately heating said pack to a temperature of approximately 1650° F. and partially drawing said pack in a forming press, withdrawing said pack from said press, reheating said pack to substantially red color and again drawing said pack until said pack is pressed into a predetermined substantially semiellipsoidal shape, and removing said cover plates from said high-strength steel plate.

4. A method of making contoured heads with integral seamless shell portions which comprises machining a circular steel alloy plate to predetermined contours including a flange portion around the periphery of said plate, machining a first circular steel cover plate to contours inverse of those machined in said alloy plate, preparing a second steel cover plate, placing said alloy plate in a pack between said cover plates with parting compound interposed between said cover plates and said alloy plate, heating said pack to a substantially cherry red color, partially drawing said pack in a forming press, withdrawing said pack from said press, reheating said pack to substantially red color and again drawing said pack into a substantially semiellipsoidal shape, removing said cover plates from said alloy plate, and ironing said flange portion into a cylindrical shell portion.

References Cited in the file of this patent

UNITED STATES PATENTS 2,960,764     Reichl _____ Nov. 22, 1960

FOREIGN PATENTS 807,805     Germany _____ July 5, 1951